United States Patent [19]  [11]  4,350,655
Hoge  [45]  Sep. 21, 1982

[54] PROCESS FOR PRODUCING HIGHLY POROUS THERMOPLASTIC FILMS

[75] Inventor: William H. Hoge, Flemington, N.J.

[73] Assignee: Biax Fiberfilm, Neenah, Wis.

[21] Appl. No.: 162,684

[22] Filed: Jun. 25, 1980

Related U.S. Application Data

[63] Continuation-in-part of Ser. No. 794,050, May 5, 1977, abandoned.

[51] Int. Cl.$^3$ ............................................. B29D 7/24
[52] U.S. Cl. ................................. 264/145; 264/171; 264/210.1; 264/210.6; 264/211; 264/288.8; 523/200; 523/216; 524/301; 524/261
[58] Field of Search ............... 264/210.1, 210.6, 288.8, 264/171, DIG. 47, 211, 145; 260/42.46

[56] References Cited

U.S. PATENT DOCUMENTS

| | | | |
|---|---|---|---|
| 3,515,626 | 6/1970 | Duffield | 264/210.6 |
| 3,694,399 | 9/1972 | Schwarz | 264/211 |
| 3,697,367 | 10/1972 | Schwarz | 264/171 |
| 3,697,474 | 10/1972 | Morris et al. | 260/40 R |
| 3,765,999 | 10/1973 | Toyoda | 264/291 |
| 3,775,521 | 11/1973 | Yamamoto et al. | 264/171 |
| 3,903,234 | 9/1975 | Ikeda et al. | 264/211 |
| 3,919,164 | 11/1975 | Hattori et al. | 260/42.46 |
| 3,929,950 | 12/1975 | Nakamura et al. | 264/49 |
| 3,995,007 | 11/1976 | Nakamura et al. | 264/211 |
| 4,116,892 | 9/1978 | Schwarz | 264/154 |

Primary Examiner—Jeffery R. Thurlow
Attorney, Agent, or Firm—Louis E. Marn; Elliot M. Olstein

[57] ABSTRACT

There is disclosed a novel process for the cold stretching at high stretch tension and at low stretch ratios of a film of a blend of synthetic orientable thermoplastic polymer and at least 50 weight percent of a coated inorganic filler selected from the group consisting of calcium carbonate, clays and titanium oxide and coated with a fatty acid ester of silicon and titanium to form a highly porous thermoplastic film (i.e. 10,000 to 100,000 surface ruptures/mm$^2$) exhibiting paper-like properties.

15 Claims, No Drawings

PROCESS FOR PRODUCING HIGHLY POROUS THERMOPLASTIC FILMS

This is a continuation-in-part of U.S. application Ser. No. 794,050, filed May 5, 1977 now abandoned.

This invention relates to a novel film of a synthetic thermoplastic polymer having a high filler content, and more particularly to a novel synthetic paper-like film formed by cold drawing a film of a synthetic thermoplastic orientable polymer admixed with a coated inorganic filler.

BACKGROUND OF THE INVENTION

A microporous sheet or film is useful as a printing substrate, such as synthetic paper; as a substitute for leather; as a highly fibrillated sheet which can easily be shredded into fine fibrils to be used as substitutes for paper-making pulps, or as a filter material, such as battery separators.

Many polymeric materials or especially blends thereof are known to undergo fibrillation and/or pore formation upon stretching or drawing. A number of such blends are described in U.S. Pat. Nos. 3,697,367 to Schwarz and 3,511,742 to Rasmussen. Such pore formation may result from different causes, such as separation of phases of incompatible polymer blends, or separation of inorganic polymer fillers like clay or titanium dioxide from the polymer matrix due to stress concentration. Most common in such systems is that the maximum pore formation effect occurs at a draw temperature which is relatively low for the particular polymer system. When the same polymer or blend thereof is stretched at higher temperatures, the pore formation diminishes and a denser film results.

At temperatures where pore formation occurs accompanied by a decrease in density, the draw tension also increases. Draw tension or yield strain also increases with increasing draw rate or operating speed, and reaches the breaking strength of the base film at speeds which are slow and uneconomical for conventional systems used for stretching or drawing of films. Operating a conventional stretching system, such as longitudinal stretching by Goudet rolls and lateral stretching by tenter frames, under tensions which approach the breaking strength of the base film often causes breaks and frequent interruptions of the process. Extrusion speeds are uneconomically slow; for instance, an acceptable draw rate of 200 cm./min. in a single longitudinal draw step over Goudet rolls for a 90 wt. % isotatic polypropylene—10 wt. % polystyrene (See Example 1), would limit the extrusion rate (for a 3' linear die at a draw ratio of 2.0 and a film thickness of 100 micron) to 23.2 lb./hr.

In copending application Ser. No. 614,018, filed Sept. 17, 1976, now U.S. Pat. No. 4,116,892, there is disclosed a method for fibrillating polymer blends of incompatible polymers or filled polymers to form fibrillated or microporous structures by cold drawing at high tension such blends or polymers utilizing the apparatus disclosed in co-pending application Ser. No. 563,623, filed Mar. 31, 1975 now abandoned, both assigned to the same assignee as the present invention.

In the past years, particularly between 1968 and 1973, there have been many attempts to make synthetic paper. Some of such attempts have involved the production of plastic films by extrusion, with the films modified by post-treatment or by additives in the extruded composition to render a paper-like product. Such films could be made suitable for packaging or printing markets which require whiteness, opacity, and a surface suitable for high-quality printing. In an article of Plastic Engineering dated August 1973, there is illustrated the surface effect resulting by admixing a non-crystalline polyethylene with calcium sulfate with a concomitant reduction of density by formation of microvoids of about 40 percent of total volume. Such product, however, was ductile and did not effectively simulate paper formed of cellulose. Products of this type have been developed by many companies in the United States, Japan and Europe. While technical difficulties in producing and using such early synthetic papers have been overcome, such synthetic paper remained too expensive for general acceptance.

Much of the past synthetic paper work has utilized finely divided mineral powders such as clays, calcium carbonate or titanium dioxide to enhance whiteness and/or to make the surface more ink-receptive and more "paper-like". This is a natural extension of known technology of including mineral powders as fillers and extenders in plastic products. The amount of mineral filler in such synthetic papers was generally less than 10% by weight and usually always less than 40% by weight.

The utilization of mineral powders improved the properties of synthetic paper but failed to overcome the uncompetitive cost factor. The mineral fillers failed to reduce the cost per sheet of paper because the cost of the mineral fillers per unit volume in the final product (including compounding cost) is almost the same as the cost per unit volume of the polymer. Therefore, the fillers offered a cost saving per pound of product but did not offer a savings per volume of product, and in the synthetic paper markets the latter is the more important.

There are several patents and publications which describe how mixtures of plastics and mineral fillers can be stretched to yield a porous product of low density. Morris et al (Tappi 45, No. 1: 162) describes the production of porous films by stretching plastic films loaded with mineral fillers treated with organic titanate compounds of about 20 weight percent. Another related development is a laminated film, such as described in British Patent No. 1,268,823 wherein one film of the laminate has a filler content of between 23 to 39 weight percent. Another description of fillers in stretched porous plastics is disclosed by Eller et al (SPE Journal 28, No. 6:54-8), wherein there is produced monoaxially-stretched tapes by stretching a film at 148° C. to form a product having a void volume of less than 40%. However, none of such films have found commercial acceptance.

OBJECTS OF THE INVENTION

It is an object of the present invention to provide a novel process for cold stretching a synthetic thermoplastic orientable polymer having a filler content of greater than 50%.

Another object of the present invention is to provide a novel process for cold stretching a synthetic thermoplastic orientable polymer having a filler content of greater than 50% at economical production rates.

Still another object of the present invention is to provide a novel process for cold stretching a film of synthetic thermoplastic orientable polymer having a high filler content of greater than 50% to produce an opaque, low density, microporous film or sheet.

A still further object of the present invention is to form a novel synthetic paper-like film from a synthetic thermoplastic orientable polymer of a high filler content.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided a novel synthetic paper product having a void volume of from about 40 to 60% and with 10,000 to 100,000 surface ruptures per mm.$^2$ from a blend of a thermoplastic orientable polymer and a coated inorganic filler material selected from the group consisting of calcium carbonate, clays and titanium dioxide of select particle size and shape. The inorganic filler material is coated with a fatty acid ester of the formula:

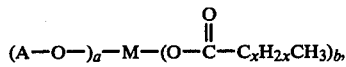

wherein
A = alkyl radical of from 1 to 6 carbons,
M = Si or Ti,
X = 12 to 24,
a = 0 to 3,
b = 1 to 4, and
a + b = 4;
and constitutes of from 50 to 70 weight percent of the blend.

In accordance with the processing aspect of the present invention, the product is produced by first casting a film of a blend of the polymer-coated inorganic filler mixture, cooling the film to a temperature of 70° C. or less (but not less than about 10° C.), and cold stretching the film mono-axially or biaxially to develop the desired void volume and surface ruptures per unit area thereby to obtain a resin content (by weight) per cubic centimeter of final product of from about 0.18 to about 0.32 gm./cc.

The blend is cold stretched mono-axially or bi-axially in any manner known to one skilled in the art and preferably in a station provided with a set of grooved rollers at a stretch rate of less than about 300 cm/sec. The groove pattern of the rolls is generally of a sinosoidal wave wherein the film is stretched in a manner to affect uniform stretching between contact points of the material to produce a material of larger dimension in the direction of stretch.

DETAILED DESCRIPTION OF THE INVENTION

The synthetic thermoplastic orientable (i.e., crystalline) polymer constituting one portion of the blend is selected from the group consisting of high-density polyethylene (HDPE); polypropylene, polyamide, polyester or mixtures thereof, with polypropylene being the particularly preferred polymer.

The inorganic mineral filler is selected from the group consisting of calcium carbonate, clay and titanium dioxide. Preferable the inorganic filler is calcium carbonate which is non-hydroscopic, is white, and is available in various particle sizes with a low-cost variation being ground limestone. The inorganic filler is of a particle size of from 1 to 5 microns and constitutes of from 0.5 to 5 percent by weight of the coated inorganic filler. The ability to obtain high pigment loadings is primarily a function of particle shape, particle size and coating treatment. In order to obtain high loadings in the polymer, the mineral or inorganic filler is coated with a fatty acid ester of the formula:

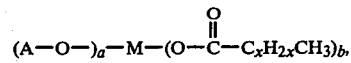

wherein
A = alkyl radical of from 1 to 6 carbons,
M = Si or Ti,
X = 12 to 24,
a = 0 to 3,
b = 1 to 4, and
a + b = 4;
and constitutes of from 50 to 70 weight percent of the blend. A preferred filler is a stearate-treated ground limestone sold by Pfizer, Inc., under the trademark "Hi-Pflex 100". "Hi-Pflex 100" has an average particle size of 3 microns and a surface area of 3.5 square meters per gram. Coated calcium carbonates are also available from other sources with various technologies of coating treatment being known to those skilled in the art.

The coated inert inorganic filler and the molten polymer are blended together to form a homogeneous mixture in a suitable mixing extruder, or in a separate preliminary compounding step, such as a Banbury mixer. The molten mixture is extruded through a die with an opening of from about 0.006 inches to about 0.030 inches, preferably from 0.006 inches to 0.010 inches. Best results are obtained if the film is cooled with minimum stretching in the molten form. In other words, drawdown of the molten film should be minimized. If the extruded mixture is stretched by more than about 100% in the melt form, there is an adverse effect on the ability to obtain a high level of void volume in the subsequent stretching step.

The coated inorganic filler materials blended with the molten polymers permit better dispersibility of the inorganic filler in the polymer melt, better extrudability of the blend as a result of decreased melt viscosity and better stretchability of the blend.

The stretching process is not critical to the preparation of laboratory demonstration samples, however, for commercial purposes the stretching process is very important for obtaining uniform properties and low manufacturing costs, with stretching being effected at a stretch rate of less than about 300 cm./sec. One such process was recently described by Schwarz (Preprints of the TAPPI 1976 Paper Synthetics Conference, Atlanta, Sept. 27, 1976).

EXAMPLES OF THE INVENTION

Operation of the process is described in the following examples which are intended to be merely illustrative and the invention is not to be regarded as limited thereto.

EXAMPLE I

A mixture of 70 weight percent calcium carbonate coated with one percent by weight of tetra-stearic silicate of a size of 1 to 5 microns, and 30 weight percent polypropylene resin sold by Hercules, Inc. under the trademark "6523 PM" is mixed in a Banbury mixer at elevated temperatures to form a homogeneous mixture. The homogeneous mixture is extruded through a slot die having an 0.01 inches opening, with the resulting extrudate being rapidly cooled with only moderate drawdown. The cooled film had a thickness of 0.005 inches and is subjected to monoaxial stretching to a ratio of 3.8X in the machine direction in a first station of grooved rollers, such as described in the aforementioned U.S. Pat. No. 4,116,892.

Stretching caused the film to change from translucent to opaque. Density dropped from 1.69 gm./cc. to 0.63 gm./cc, indicating a void volume of 62.7%. The sheet was smooth and non-glossy and exhibited surface ruptures of 18,000/mm$^2$. In spite of the high limestone content, the sheet was not abrasive and did not exhibit metal marking when rubbed with a coin or a paper clip. The polypropylene content of such synthetic paper was 0.189 gm./cc.

The unstretched film is initially quite weak and can only be stretched by hand very slowly (100 cm./min.) in order not to break during stretching. Conventional stretching methods would be required to operate at too slow a speed to provide meaningful yields. The grooved roll process makes it possible to stretch such a composition at faster speeds to a porous, bulky, low density product, without breaking the film due to high draw tensions. The cold drawing process results in an "open-cell" pore structure, i.e., the material is permeable to vapors and liquids.

EXAMPLES II

The composition of Example I is stretched in the grooved rolls—a one pass longitudinal stretch and a one pass lateral stretch. The sample is extended from 4×4" to 5.5×5.5" in size, the thickness changed form 0.0040" to 0.0038". The sample weight was 1.77 grams indicating an original density of 1.69 gm./cm.$^3$ and a final density of 0.94 gm./cm.$^3$, or an air void volume of 46%.

The stretched sample is once again biaxially stretched resulting in a sample stretched to a shape of 6.8×6.8" of a thickness of 0.032" having a density of 0.73 gm./cm. and a void volume of 57%. Surface ruptures are 12,500/mm.$^2$. Air and liquid (acetone, ethanol) may be passed through the film sample under a pressure of 20 psi.

EXAMPLE III

A compounded blend of 50 wt. % polypropylene (Profax 6423) and 50 wt. % clay coated with 3 percent by weight of triisopropyl monooleic titanate (such as disclosed in U.S. Pat. No. 3,697,474) is pressed into a film of 0.003 inch thickness in a "Dake" press. The sample is cut to a size of 4×4" and is stretched as in Example II to a size of 5.5×5.5" with a resulting thickness of 0.0037".

The film after stretching exhibited the following properties:
Draw Ratio:1.89
Void Volume:43%
Density:0.84 g/cm$^3$ (original:1.47 g/cm$^3$)
Surface Ruptures:14,000/mm.$^2$
The stretched film was permeable to air.

EXAMPLE IV

A mixture of 70 weight percent calcium carbonate coated with one percent by weight of tetra-stearic silicate of a size of 1 to 5 microns, and 30 weight percent polypropylene resin sold by Hercules under the trademark of "6523 PM" is mixed in a Banbury mixer at elevated temperatures to form a homogeneous mixture. The homogeneous mixture is extruded through a slot die at 220"C. having an opening of 0.014 inches, and is drawn down to a thickness of about 0.006 inches. This film is permitted to cool to room temperature and is therefore longitudinally stretched by hand until all areas of the sheet had been transformed from the initial dull translucent condition to a white opaque condition. This uniaxially stretched film had a thickness of 0.0042 inches and a density of 0.623 gm./cc. The calculated void volume was 62.9%. The sample was receptive to writing from pencil, ball point pen and typewriter and exhibited most of the properties of paper stationary.

EXAMPLE V

A mixture of 50 parts by weight calcium carbonate coated with one percent by weight of tetra-stearic silicate of a size of 1 to 5 microns, and 50 parts by weight of polypropylene resin (sold by Hercules under the trademark of "5523 PM") is mixed in a Banbury mixer at elevated temperatures to form a homogeneous mixture. The homogeneous mixture is extruded through a slot die at 220° C., having an opening of 0.035 inches, and is drawn down to a thickness of about 0.007 inches. This mixture is cooled to room temperature and is longitudinally stretched by hand until all areas of the sheet had been transformed from the initial dull translucent condition to a white opaque condition. The uniaxial stretching of this film of 50% filler is more difficult and more prone to web breaks than had been observed in the above example with 70% filler. The unstretched film contained longitudinal striations which were apparently caused by the drawing down of the melt from the 0.035 inches thickness as it exited from the die to the 0.007 inches thickness at the time of cooling. These striations appeared to be the cause of the tendency to form web breaks. The uniaxially stretched film had a thickness of 0.0062 inches and a density of 0.631 gr./cc. The calculated void volume was 62.6%.

EXAMPLE VI

A compounded blend of 30% by weight polypropylene (Profax 6423) and 70% calcium carbonate of a particle size of 0.5 to 1 micron coated with 1.5% by weight of isopropyl tristearic titanate is pressed into a film of 0.004 inch thickness in a "Dake" press. A 4×4" sample is stretched as in Example II to a size of 7×7 inch to a draw ratio of 1.75×1.75 or area draw ratio (=area stretch ratio) of 3.06. The initial density of the film was 1.89 g/cm$^3$ and after stretching the film had a thickness of 0.004 inch and a density of 0.63 g/cm$^3$ indicating a void volume of 66%. The stretched film is permeable to solvents, such as toluene, methanol and acetone, indicating a continuous pore structure and exhibiting approximately 85,000 surface ruptures/mm.$^2$.

It is readily apparent from the foregoing description that a synthetic paper-like material may be economically stretched in a grooved roll apparatus at a relatively low draw ratios to form highly porous structures having from 10,000 to 100,000 surface ruptures per mm$^2$. Generally, most practical applications will require bi-axial stretching, although for some application, mono-axial stretching will suffice.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention by only limited by the claims and the equivalents thereof.

I claim:

1. A process for forming a synthetic paper-like film which comprises:
(a) admixing a thermoplastic orientable polymer with a coated inorganic filler selected from the group consisting of calcium carbonate, clays and titanium oxide in an amount sufficient to constitute at least 50 weight percent of the resulting mixture, said coated inorganic filler being coated with a fatty acid ester of the formula:

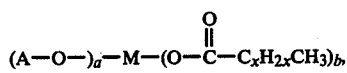

wherein
A = alkyl radical of from 1 to 6 carbons,
M = Si or Ti,
x = 12 to 24,
a = 0 to 3,
b = 1 to 4, and
a + b = 4.
(b) extruding said mixture at elevated temperatures to form a film thereof;
(c) cooling said film to a temperature below about 70° C.; and
(d) stretching said thus cooled film.

2. The process as defined in claim 1 wherein said film is extended to a thickness of less than about 0.010 inches.

3. The process as defined in claim 1 wherein said resulting film is cut into sheets.

4. The process as defined in claim 1 wherein the amount of said coated inorganic filler is from 50 to about 70 weight percent of said resulting mixture.

5. The process as defined in claim 1 wherein said stretched film has a resin content of from 0.18 to 0.32 grams per cubic centimeter.

6. The process as defined in claim 1 wherein said thermoplastic orientable polymer is selected from the group consisting of high density polyethylene, polypropylene, polyesters, polyamide and mixtures thereof.

7. The process as defined in claim 6 wherein said thermoplastic orientable polymer is polypropylene.

8. The process as defined in claim 1, wherein said coated inorganic filler is prepared from ground limestone.

9. The process as defined in claim 8 wherein said ground limestone has an average particle size greater than 2 microns and less than 5 microns.

10. The process of claim 1 wherein said film is stretched at a rate of less than 300 cm./sec.

11. The process as defined in claim 1 wherein said film is biaxially stretched.

12. The process of claim 1 wherein said film is stretched to form a stretch film having a reduced film weight of at least 60 percent.

13. The process of claim 1 wherein said mixture is comprised of from 30 to 50 weight percent thermoplastic orientable polymer and of from 70 to 50 weight percent coated inorganic filler.

14. The process as defined in claim 1 wherein stretching of said film is effected by introducing said film into a nip of interdigitation rollers having grooves substantially parallel to the axis of said rollers; and wherein the velocity of introduction of said film into said nip is controlled to assume and maintain the velocity substantially identical to the rotational velocity of said rollers thereby to longitudinally stretch incremental portions of said film; and wherein said stretched film is withdrawn from said rollers at a velocity greater than the rotational velocity of said rollers.

15. The process as defined in claim 14 wherein the withdrawal velocity of stretched film is not greater than a factor of the draw ratio of said nip.